United States Patent [19]
Gapp et al.

[11] 3,848,389
[45] Nov. 19, 1974

[54] BIMETAL RIVETS
[75] Inventors: Roland Howard Gapp, South Laguna; Marcos Daniel Alazraki, Orange; John Harper, Santa Ana, all of Calif.
[73] Assignee: Textron Inc.
[22] Filed: Apr. 19, 1972
[21] Appl. No.: 245,408

Related U.S. Application Data
[63] Continuation of Ser. No. 888,999, Dec. 29, 1969, abandoned, which is a continuation-in-part of Ser. No. 733,567, May 31, 1968, abandoned.

[52] U.S. Cl. ................ 52/758 D, 29/470.3, 85/37
[51] Int. Cl. ..................... F16b 5/04, F16b 19/06
[58] Field of Search ............... 85/37, 38, 39, 74–78, 85/10.1, 1 P, 1 C; 29/470.3, 470.1, 484, 198, 196.1, 191, 512, 526, 522–523, 522 R; 10/27; 287/189.36 B; 219/118

[56] References Cited
UNITED STATES PATENTS

| 384,318 | 6/1888 | Kirks | 85/37 |
| 1,393,726 | 10/1921 | Pfanstiehl | 148/127 X |
| 2,393,564 | 1/1946 | Poupitch | 85/37 |
| 2,431,853 | 12/1947 | Wischhusen et al. | 85/1 C X |
| 2,663,270 | 12/1953 | Friedly | 85/37 X |
| 3,100,338 | 8/1963 | Henry | 29/198 X |
| 3,175,284 | 3/1965 | Cotovsky | 29/470.3 |
| 3,298,725 | 1/1967 | Boteler | 85/1 R X |
| 3,323,203 | 6/1967 | Hollander et al. | 29/470.3 |

Primary Examiner—Ramon S. Britts
Attorney, Agent, or Firm—George B. White

[57] ABSTRACT

A rivet head and shank section of a high strength metal is combined with a tail section of a more ductile and easily formable metal to produce a rivet possessing the highly superior properties of both. Novel configurations at the junction between the two metals provide added advantages.

16 Claims, 5 Drawing Figures

INVENTORS
ROLAND HOWARD GAPP
MARCOS DANIEL ALAZRAKI
JOHN HARPER

BY George B. White

ATTORNEY

BIMETAL RIVETS

This is a continuation of application Ser. No. 888,999, now abandoned, which was a continuation-in-part of Ser. No. 733,567, now abandoned.

BACKGROUND OF THE INVENTION

The use of special alloys and metals for rivets has been increasing over recent years. This is especially true where high strength at elevated temperatures is required, as for example in the aircraft and aerospace industries. In these applications also light weight has always been of considerable importance. For such applications titanium and titanium alloys have found much favor.

Other alloys have also been found favorable but all these, including the titanium alloys, present a common problem. A material which offers the satisfactory strength properties is usually difficult to rivet by conventional methods. They do not have sufficient ductility and are not readily formable into a rivet head. This often results in the formation of an unsatisfactory rivet or the actual splitting of the head during riveting.

It is therefore an object of our invention to provide a rivet of a high strength alloy such as those of titanium on which it would be possible to form a satisfactory rivet head.

It is a more specific object of our invention to provide a bimetallic rivet in which the head and shank of the rivet would be composed of a high strength metal, whereas the tail or head forming end would be composed of a ductile and readily formable material.

It is an additional object of our invention to provide a novel configuration of a bimetallic rivet which would readily facilitate the joining of the two sections of the rivet by existing means.

It is yet another object of our invention to provide a novel configuration of a bimetallic rivet which would facilitate the formation of the rivet head in the field.

SUMMARY

We have discovered that by using pure titanium, titanium alloys and other special metals and alloys to form two separate sections of our rivet body and then forming these sections together by means of an integral joining process, we are able to provide an unusual rivet which will give a high strength at room and elevated temperatures and stll enable use to form a satisfactory rivet and head in the field.

We have discovered further that by using various unusual geometries at the point where the two different materials are joined, we are able not only to obtain a satisfactory integral joint, using established joining processes, but also facilitate the formation of the rivet head. This will all be evident from the description and drawings which follow.

DESCRIPTION OF PREFERRED EMBODIMENTS

Figure 1:
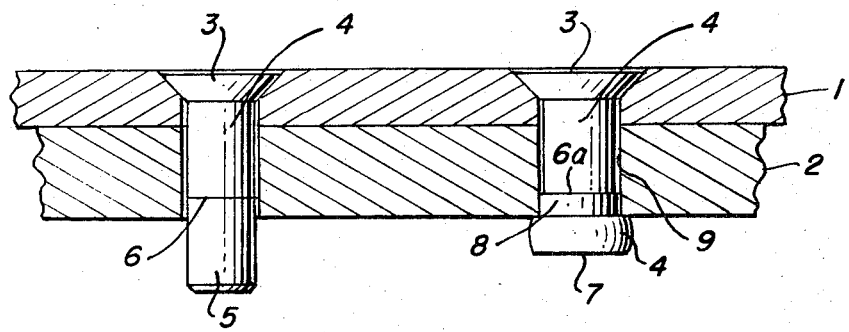
FIG. 1 is a cross-section through a riveted joint showing one bimetallic rivet before driving and one after driving under one set of conditions.
Figure 2:
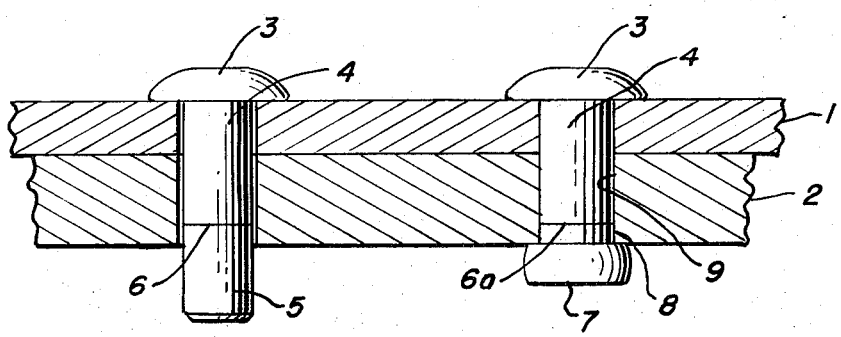
FIG. 2 is a cross-section through a riveted joint showing one bimetallic rivet before driving and one after driving under another set of conditions.

Referring now more particularly to FIG. 1 and FIG. 2, there are seen plates 1 and 2 in the process of being joined together by rivets 3. A flat or counter-sunk head rivet is shown in FIG. 1, while a button head rivet is shown in FIG. 2. Our invention may be adapted to an style of rivet head, as will become evident from what follows. The body or shank of the rivet 4 is joined to the tail section 5 at interface 6. It is evident that in each Figure, one rivet is shown before driving and one after driving. The location of the interface 6 is shown before driving and 6a after driving. After driving, the driven head appears at 7, the lower portion of the rivet at 8, and the upper portion at 9.

In previous constructions attempts have been made to heat treat the tail section 5 of the rivet, which, of course, was composed of a single metal, in order to render it more ductile and formable. This, however, resulted in a gradual change in properties of the rivet shank and not a sudden change as in the present invention. Consequently, when the rivet was driven, the upsetting action of the shank was not uniform and the rivet did not completely fill the rivet hole at the upper section 9 as shown on FIG. 1. To develop its proper maximum strength, the rivet shank or body should completely fill the rivet hole as shown at 9 in FIG. 2, as is well known to those skilled in the art.

Attempts have been made to overcome this by using a washer between plate 2 and head 7 to facilitate formation of the head in a difficult to deform rivet shank. Use of the rivets of the present invention, of course, eliminates the need for a washer, enables us to provide a satisfactory head 7, as well as a satisfactory rivet bearing in the rivet hole, as shown at 8 and 9 in FIG. 2.

We have discovered that we may use materials for the shank, or body section 4 of our rivet which have a shear strength of up to 180,000 pounds per square inch, a tensile strength of up to 300,000 pounds per square inch at room temperature and an acceptable strength at temperatures as high as 1,000° F.

Materials used for the tail section 5, besides being ductile and readily formable, should be compatible with the material used for the shank section 4 insofar as being capable of joining integrally with one another at an interface 6 by means of friction welding or other integral forming processes known in the art. Materials which we have discovered that may be so combined to form the unusual rivet of our invention are tabulated below.

Table I

| Head & Shank Section 3 & 4 | Tail Section 5 | |
|---|---|---|
| | Pure Titanium | |
| | Columbium Alloy | Cb-1Zr |
| | do. | Cb-752 |
| | do. | Cb-10W-10Ta |
| Ti-6Al-4V | Tantalum Alloy | FS 60 |
| | Zirconium Alloy | Zirconium 2 |
| | Pure Vanadium | |
| | Pure Molybdenum | |
| Ti-8Al-1Mo-1V | Same as above for all materials. | |
| Ti-6Al-6V-2Sn | Same as above for all materials. | |

Table I-Continued

| Head & Shank Section | Tail Section |
| --- | --- |
| 3 & 4 | 5 |
| Ti-13V-11Cr-3Al | Same as above for all materials. |
| H-11 | A-286 Stainless Steel – Monel |
| VascoMax 300 | A-286 Stainless Steel – Monel |

Vasco 300 designates Vanadium Alloys Steel Co.'s alloy consisting of approximately 18 percent nickel, 9 percent cobalt, 0.5 percent molybdenum, 0.6 percent titanium, 0.1 percent aluminium and 0.02 percent carbon.

The chemical composition of materials represented by the other material symbols used herein may be found in the publication DMIC Memorandum 232 dated Feb. 1, 1968, entitled "Designations of Alloys for the Aerospace Industry (Revised)" and published by Defense Metals Information Center, Battelle Memorial Institute, Columbus, Ohio 43201.

The actual configuration of the interface 6 between the two different metals forms an important feature of our invention. As stated above, this joint may be formed by any integral joining process such as friction welding, metallurgical bonding of the pressure, vacuum or diffusion type, as well as fusion welding by means of electron or laser beams. Various configurations which we have shown to be particularly advantageous are shown on FIG. 3, FIG. 4 and FIG. 5. In each case, the interface before driving is shown at 6 and after driving at 6a. It should be noted that in all instances the interface must bear a definite relation insofar as position is concerned to the plates 1 and 2. For the flat or plane interface shown on FIG. 1 and FIG. 2 it is essential that it lie within the confines of the outside planes of the sheets which define the grip of the rivet. In the case of the configurations shown on FIG. 3, FIG. 4 and FIG. 5, the interface must lie substantially within the grip of the rivet as described more fully below.

Figure 3:
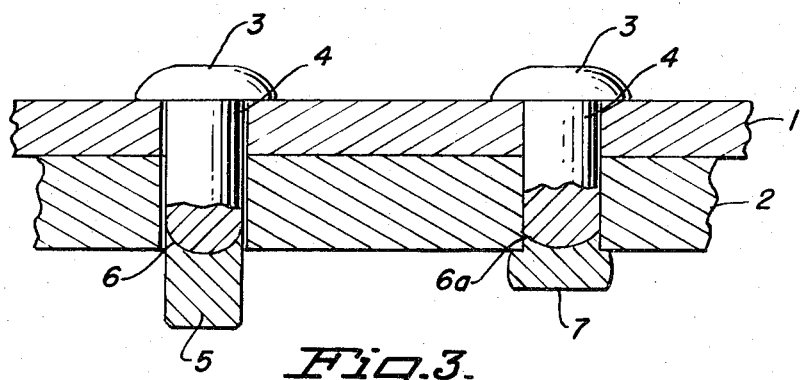
FIG. 3 is a cross-section through a riveted joint showing bimetallic rivets having a spherical interface.
Figure 4:
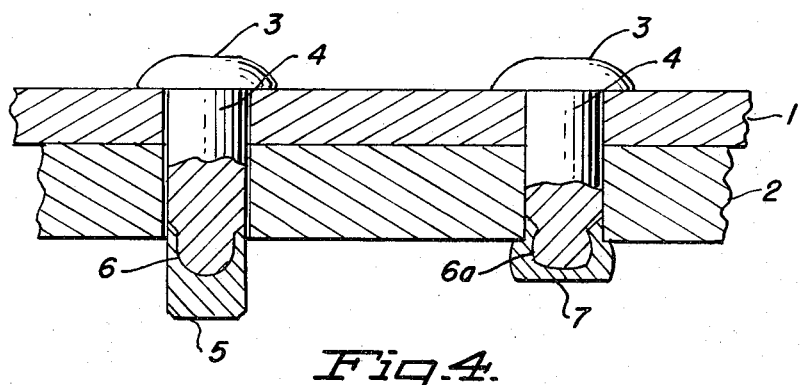
FIG. 4 is a cross-section through a riveted joint showing bimetallic rivets having an alternate embodiment of curved interface.
Figure 5:
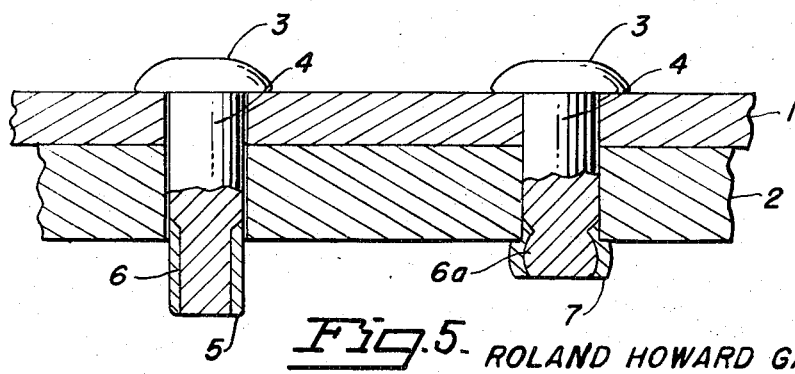
FIG. 5 is a cross-section through a riveted joint showing bimetallic rivets having an annular interface.

All of the configurations shown in FIG. 3, FIG. 4 and FIG. 5 provide a greater surface area between shank section 4 and tail section 5, thus providing for a stronger integral joint. In addition to forming a satisfactory head 7 including expansion of the tail section 5 into the opening in plate 2 as shown, they all facilitate the upsetting of the shank 4 as discussed above and described more fully below.

Thus, in FIG. 3 there is shown a spherical interface 6 which is convex as to shank section 4 and concave as to tail section 5. With this configuration we have discovered that a good head 7 may be formed while also providing for improved expansion of the shank 4 into the holes in plates 1 and 2 as shown.

In the configuration of FIG. 4 we provide what we may call a male and female type of interface. This comprises a substantially deeper penetration of the shank section 4 into the tail section 5 than that provided in FIG. 3. The shank section protrudes a considerable distance beyond the outer surface of plate 2 and hence the riveting action produces a greater upsetting effect upon shank section 4 insuring more complete filling of the holes in plates 1 and 2 by the rivet shank.

In the annular configuration shown in FIG. 5, the shank section extends through the entire length of the rivet and the tail section is positioned concentrically around the outside of the shank section. The tail section likewise penetrates into plate 2 in this configuration. Upon formation of the rivet head 7 there is seen an expansion of the shank section 4 to completely fill the holes in plates 1 and 2 and also an upset of the shank section 4 outside the plate. The rivet head formed in a tail section surrounds this upset portion of the end of the shank section and also penetrates inside the hole of plate 2, thus producing a vastly superior head.

Of the three configurations disclosed herein it is evident that FIG. 3 is the simplest and most economical to manufacture, whereas, FIG. 5 is the most difficult. The decision as to which configuration to use is a question of economics coupled with the stringency of the requirements of the application, and degree of resistance to expansion of the material used in the shank. All have their advantages, as disclosed above and, it is submitted, are novel and distinct with respect to one another.

The integral forming processes which may be used to form the joint between the two sections of the rivet, employing these configurations, are the same as those disclosed for the flat plane interface of FIG. 1 and FIG. 2 described above.

It was also discovered that a still firmer union can be accomplished if the head and shank section are subjected to heat treatment and the tail section also subjected to heat treatment separately prior to welding so that the head and shank section is treated to have a relatively high shear strength and the tail section is pretreated so as to have appreciably lower shear strength and sufficient ductility to be readily formed or upset without cracking.

In connection with bimetal fasteners where the individual sections are composed of materials having substantially different chemical compositions, for instance the combinations hereinabove recited, the sections may be subjected to different heat treatment after the sections are welded together, namely, the head and shank material is hardened to a relatively high shear strength, while the tail material remains or is made appreciably lower in shear strength and with sufficient ductility to be readily formed or upset without cracking.

Examples of materials where the same material is used for both sections and may be heat treated as aforesaid are; Ti-6Al-4V, Beta III (Ti-11.5 Mo-6Zr-4.5Sn), Ti-8Mo-8V-2Fe-3Al, and Beta C (Ti-3Al-8V-6Cr-4Mo-4Zr).

Examples where the two sections are of different materials and could be treated either before or after welding, are: Ti-6Al-4V for the head and shank section; and Pure Titanium, Ti-3Al-2.5V, Beta III (Ti-11.5 Mo-6Zn-4.5Sn), Ti-8Mo-8V-2Fe-3Al, or Beta C (Ti-3Al-8V-6Cr-4Mo-4Zr) for the tail section.

Further examples of materials of like or nearly like chemical composition heat treated to different conditions as separate parts prior to welding, are as follows:

| HEAD & SHANK SECTION | TAIL SECTION |
| --- | --- |
| 6Al-4V titanium solution treated 1625° 1 hr $10^{-4}$ WQ – aged 1000° 4 hrs $10^{-4}$ AC | 6Al-4V titanium annealed 1325° 1 hr $10^{-4}$ AC |
| Beta III titanium (made by Crucible Reactive Metals) Beta III titanium solution | |

| HEAD & SHANK SECTION | TAIL SECTION |
|---|---|
| (nominal composition 11.5 Mo-6Zr-4.5Sn) solution teated 1325–1350° 5 min. 10⁻⁴ WQ aged 900° 4 hrs 10⁻⁴ AC | treated 1275–1300° 5 min. 10⁻⁴ WQ – aged 1100° 4 hrs. 10⁻⁴ raised to 1175° 1½ hrs. 10⁻⁴ AC |
| 8Mo-8V-2Fe-3Al (made by Timet) titanium solution treated 1425° 5 min. 10⁻⁴ WQ – aged 900° 4 hrs 10⁻⁴ AC | 8-8-2-3 titanium hot rolled, straightened and ground |
| Beta C (made by Reactive Metals) titanium (nominal composition 3Al-8V-6Cr-4Mo-4Zr) cold drawn 39% and aged 900° 4 hrs AC | Beta C titanium solution treated 1500° 15 mins. 10⁻⁴ AC |

The above mentioned heat treated conditions would not be obtainable by heat treating the above metals after welding.

Additional examples of metals and their heating either before or after welding are as follows:

| HEAD & SHANK SECTION | TAIL SECTION | |
|---|---|---|
| 6Al-4V titanium solution treated 1625° 1 hr. 10⁻⁴ WQ – aged 1000° 4 hrs 10⁻⁴ AC | Pure titanium | |
| | 3Al-2.5V annealed 1300° 1 hr 10⁻⁴ AC | |
| | Beta III ) | condition as listed in |
| | 8.8.2.3 ) | para.1 above for tail |
| | Beta C ) | section |
| In the above examples: | AC stands for Air Cool WQ stands for Water Quench 10⁻⁴ is degree of vacuum expressed in Torr units. | |

We claim:

1. In combination a plurality of structural members having axially aligned apertures therein, and a bimetal rivet of a predetermined grip length extending through said aligned apertures fastening said members together, the meeting areas of said members forming a high shear zone, said rivet comprising a solid integral head and shank section of a first metal having a high shear and tensile strength at room temperature and up to at least 1,000° F., said head and shank section consisting of an enlarged head portion and a cylindrical shank extending therefrom, a solid tail section of a ductile and readily formable second metal being compatible with the metal of the head and shank section for integral union therewith, the shank of said head and shank section and said tail section being of the same diameter, said tail section and the shank of said head and shank section being united end to end and forming an interface between the entire cross-sectional area of their meeting ends, said interface comprising an integral welded joint, said interface being located within the grip length of said rivet, and only the shank of said head and shank section extending across said high shear zone, said tail section projecting beyond the adjacent surface of the structural member most remote from said head and being upset, thereby securely clamping said structural members together.

2. A invention comprising a solid head and shank section of a metal having a high shear and tensile strength at room temperature and up to at least 1,000° F., a tail section of a ductile and readily formable metal being compatible with the metal of the head and shank sections for integral union therewith, the shank of said head and shank section and said tail section being of the same diameter, said tail section and the shank of said head and shank section being united end to end and forming an interface between their meeting ends, said interface being positioned within the grip length of said rivet, said interface comprising a friction welded joint, The bimetal rivet specified in claim 1, and said head and shank section comprised entirely of an alloy selected from the group consisting of Ti-6Al-4V, Ti-8Al-1Mo-IV, and Ti-13V-11Cr-3Al, and said tail section comprised entirely of a metal selected from the group consisting of titanium, vanadium, molybdenum, Cb-1Zr. Cb-752, Cb-10W-10Ta, tantalum FS60 and zirconium 2.

3. The bimetal rivet specified in claim 1, and said head and shank section comprising entirely the alloy H-11 and said tail section comprising entirely an alloy selected from the group consisting of A-286 stainless steel and monel.

4. The bimetal rivet specified in claim 1, and said head and shank section comprising entirely VascoMax 300 and said tail section comprising entirely an alloy selected from the group consisting of A-286 stainless steel and monel.

5. The invention of claim 1 in which said first metal of the head and shank section and said second metal of the tail section are metals having substantially the same chemical compositions and being heat treated prior to welding the sections together.

6. The invention of claim 5 in which the first metal is selected from the group consisting of:

6 Al-4V titanium solution treated 1625° 1 hr 10⁻⁴ WQ - aged 1,000° 4 hrs 10⁻⁴ AC;

Beta III titanium (made by Crucible Steel) (nominal composition 11.5 Mo-6Zr-4.5Sn) solution treated 1325°–1350° 5 min.10⁻⁴ WQ aged 900° 4 hrs 10⁻⁴ AC;

8Mo-8V-2Fe-3Al (made by Timet) titanium solution treated 1425° 5 min. 10⁻⁴ WQ- aged 900° 4 hrs 10⁻⁴ AC;

Beta C (made by Reactive Metals) titanium (nominal composition 3Al-8V-6Cr-4Mo-4Zr) cold drawn 39 percent and aged 900° 4 hrs AC;

wherein AC stands for Air Cool, WQ stands for Water Quench, $10^{-4}$ is degree of vacuum expressed in Torr units.

7. The invention of claim 5 in which the second metal of the tail section is selected from the group consisting of:

6Al-4V titanium annealed 1,325° 1 hr $10^{-4}$ AC;

Beta III titanium solution treated 1275°–1300° 5 min. $10^{-4}$ WQ - aged 1,100° 4 hrs $10^{-4}$, raised to 1,175° 1½ hrs. $10^{-4}$ AC;

8-8-2-3 titanium hot rolled, straightened and ground;

Beta C titanium solution treated 1,500° 15 mins. $10^{-4}$ AC;

wherein AC stands for Air Cool, WQ stands for Water Quench, $10^{-4}$ is degree of vacuum expressed in Torr units.

8. The invention of claim 6 in which the second metal of the tail section is selected from the group consisting of:

6Al-4V titanium annealed 1325° 1 hr $10^{-4}$ AC; Beta III titanium solution treated 1,275°–1,300° 5 min. $10^{-4}$ WQ-aged 1,100° 4 hrs $10^{-4}$, raised to 1,175° 1½ hrs. $10^{-4}$ AC; 8-8-2-3 titalium hot rolled, straightened and ground; Beta C titanium solution treated 1,500° 15 mins. $10^{-4}$ AC;

wherein AC stands for Air Cool, WQ stands for Water Quench, $10^{-4}$ is degree of vacuum expressed in Torr units.

9. The invention of claim 4 in which said first metal of the head and shank section and said second metal of the tail section are of different chemical compositions.

10. The invention of claim 9 in which said first metal of the head and shank section comprises an alloy selected from the group consisting of Ti-6Al-4V, Ti-8Al-1Mo-1V, and Ti-13V-11Cr-3Al.

11. The invention of claim 9 in which said second metal of the tail section comprises a metal selected from the group consisting of titanium, vanadium, molybdenum, Cb-1Zr, Cb-752, Cb-10W-10Ta, tantalum FS60 and zirconium 2.

12. The invention of claim 9 in which said first metal of the head and shank section comprises an alloy selected from the group consisting of Ti-6Al-4V, Beta III (Ti-11.5 Mo-6Zr-4.5Sn), Ti-8Mo-8V-2Fe-3Al, and Beta C (Ti-3Al-8V-6Cr-4Mo-4Zr).

13. The invention of claim 9 in which said second metal of the tail section comprises a metal selected from the group consisting of Ti-6Al-4V for the head and shank section; and Pure Titanium, Ti-3Al-2.5V, Beta III (Ti-11.5 Mo-6Zn-4.5Sn), Ti-8Mo-8V-2Fe-3Al, or Beta C (Ti-3Al-8V-6Ce-4Mo-4Zr) for the tail section.

14. The invention of claim 9 in which said first metal of the head and shank section comprises 6Al-4V titanium solution treated 1,625° 1 hr $10^{-4}$ WQ - aged 1,000° 4 hrs $10^{-4}$ AC, wherein AC stands for Air Cool, WQ stands for Water Quench, $10^{-4}$ is degree of vacuum expressed in Torr units.

15. The invention of claim 9 in which said second metal of the tail section comprises a metal selected from the group of Pure titanium 3Al-2.5V annealed 1,300° 1 hr $10^{-4}$ AC Beta III titanium solution treated 1275-1300° 5 min. $10^{-4}$ WQ - aged 1100° 4 hrs $10^{-4}$, raised to 1,175° 1½ hrs. $10^{-4}$ AC 8-8-2-3 titanium hot rolled, straightened and ground Beta C titanium solution treated 1,500° 15 mins. $10^{-4}$ AC wherein AC stands for Air Cool, WQ stands for Water Quench, $10^{-4}$ is degree of vacuum expressed in Torr units.

16. The invention of claim 1 wherein the first metal of said head and shank section and said second metal of said tail section each is individually heat treated respectively to said high shear and tensile strength and to ductility.

* * * * *

UNITED STATES PATENT OFFICE
CERTIFICATE OF CORRECTION

Patent No. __3,848,389__      Dated __November 19, 1974__

Inventor(s) __Roland Howard Gapp, Marcos Daniel Alazraki and John Harper.__

It is certified that error appears in the above-identified patent and that said Letters Patent are hereby corrected as shown below:

Column 2, line 12 change "an" to - any - .

Columns 5 and 6 - cancel "A invention comprising a solid head and shank section of a metal having a high shear and tensile strength at room temperature and up to at least 1,000° F., a tail section of a ductile and readily formable metal being compatible with the metal of the head and shank sections for integral union therewith, said interface being positioned within the grip length of said rivet, said interface comprising a friction welded joint,"

Claim 9, line 1 change "4" to - 1 - .

Signed and sealed this 22nd day of April 1975.

(SEAL)
Attest:

RUTH C. MASON
Attesting Officer

C. MARSHALL DANN
Commissioner of Patents
and Trademarks